United States Patent [19]

Hanson

[11] 4,023,509
[45] May 17, 1977

[54] APPARATUS FOR PLANTING A PLURALITY OF INDIVIDUAL SEEDS IN A PLANTING FURROW

[76] Inventor: Morris R. Hanson, Rte. No. 2, Winnebago, Minn. 56098

[22] Filed: Nov. 12, 1975

[21] Appl. No.: 631,072

[52] U.S. Cl. .................. 111/77; 221/211; 222/371
[51] Int. Cl.² .......................... A01C 7/18
[58] Field of Search ............ 222/371, 263, 76, 86; 221/278, 253, 236, 237, 211, 79, 81, 82, 84, 85, 266; 111/34–51, 77

[56] References Cited

UNITED STATES PATENTS

| | | |
|---|---|---|
| 3,122,283 | 2/1964 | Walters ................ 222/371 |
| 3,312,152 | 4/1967 | Williamson ........... 222/371 X |
| 3,325,060 | 6/1967 | Rehder ................ 222/371 |
| 3,636,897 | 1/1972 | Brink ................. 221/237 |
| 3,640,428 | 2/1972 | Knapp ................ 221/211 |
| 3,913,503 | 10/1975 | Becker ............... 221/236 |

Primary Examiner—Stanley H. Tollberg
Attorney, Agent, or Firm—Merchant, Gould, Smith, Edell, Welter & Schmidt

[57] ABSTRACT

An improved seed planter having a seed conveyor which, in combination with a means for placing seeds on the seed conveyor as they are dispensed from a seed hopper, transports the seeds from the seed hopper to a seed release point in close proximity to the desired seed planting site in the tilled soil.

7 Claims, 15 Drawing Figures

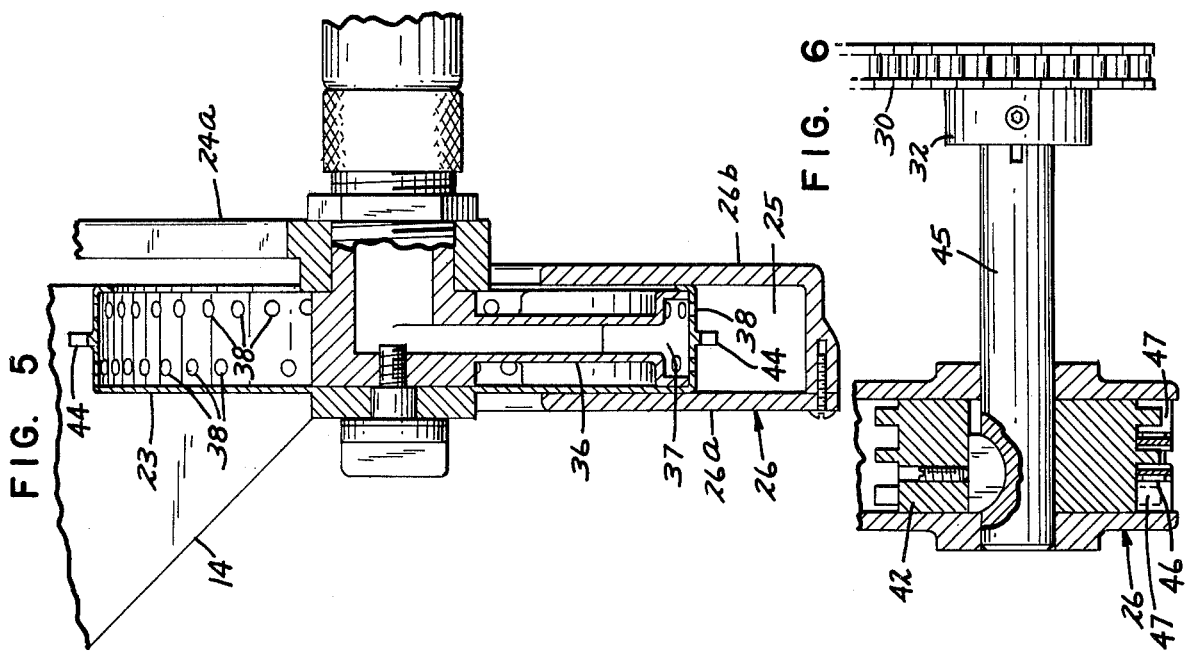
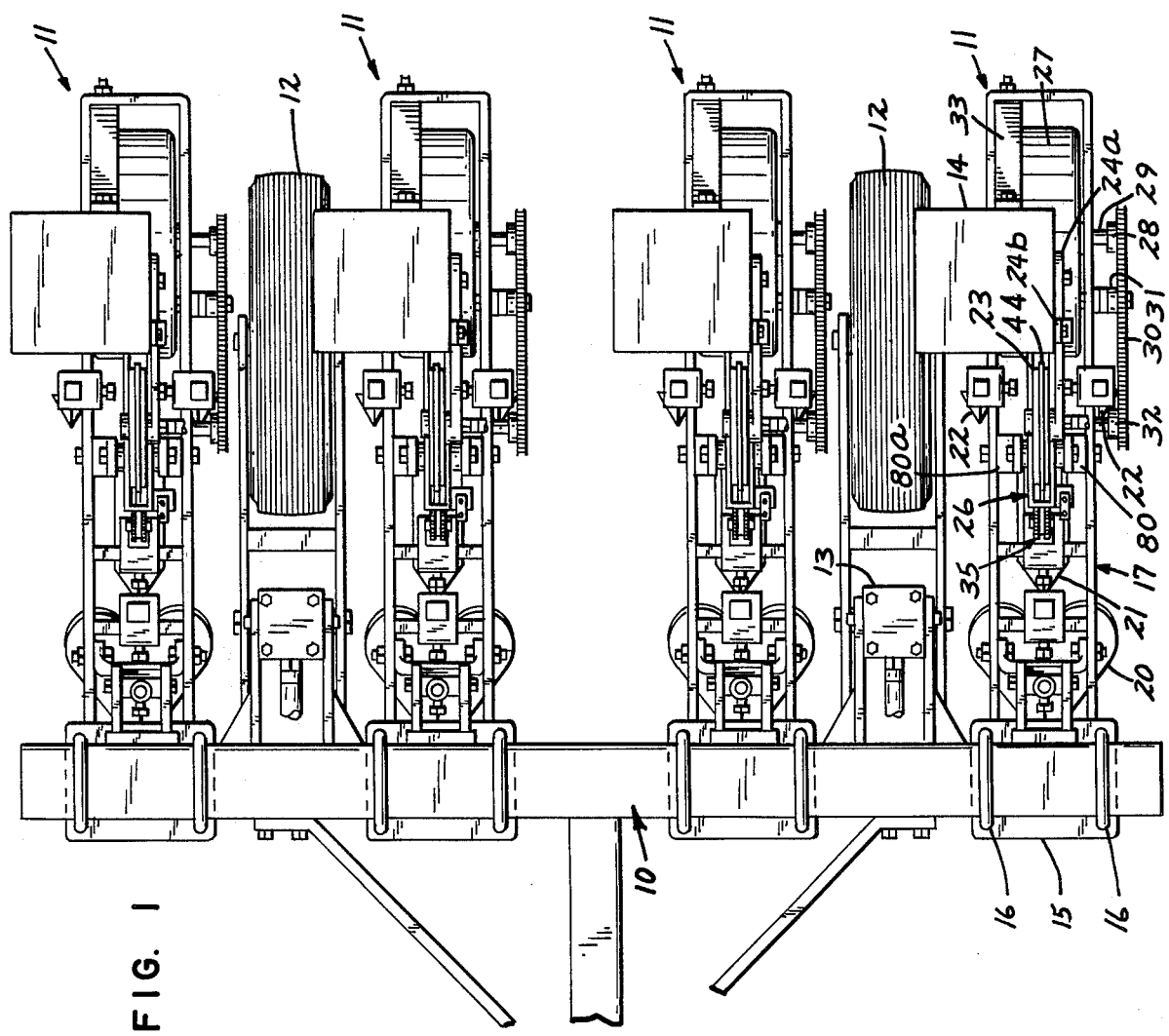

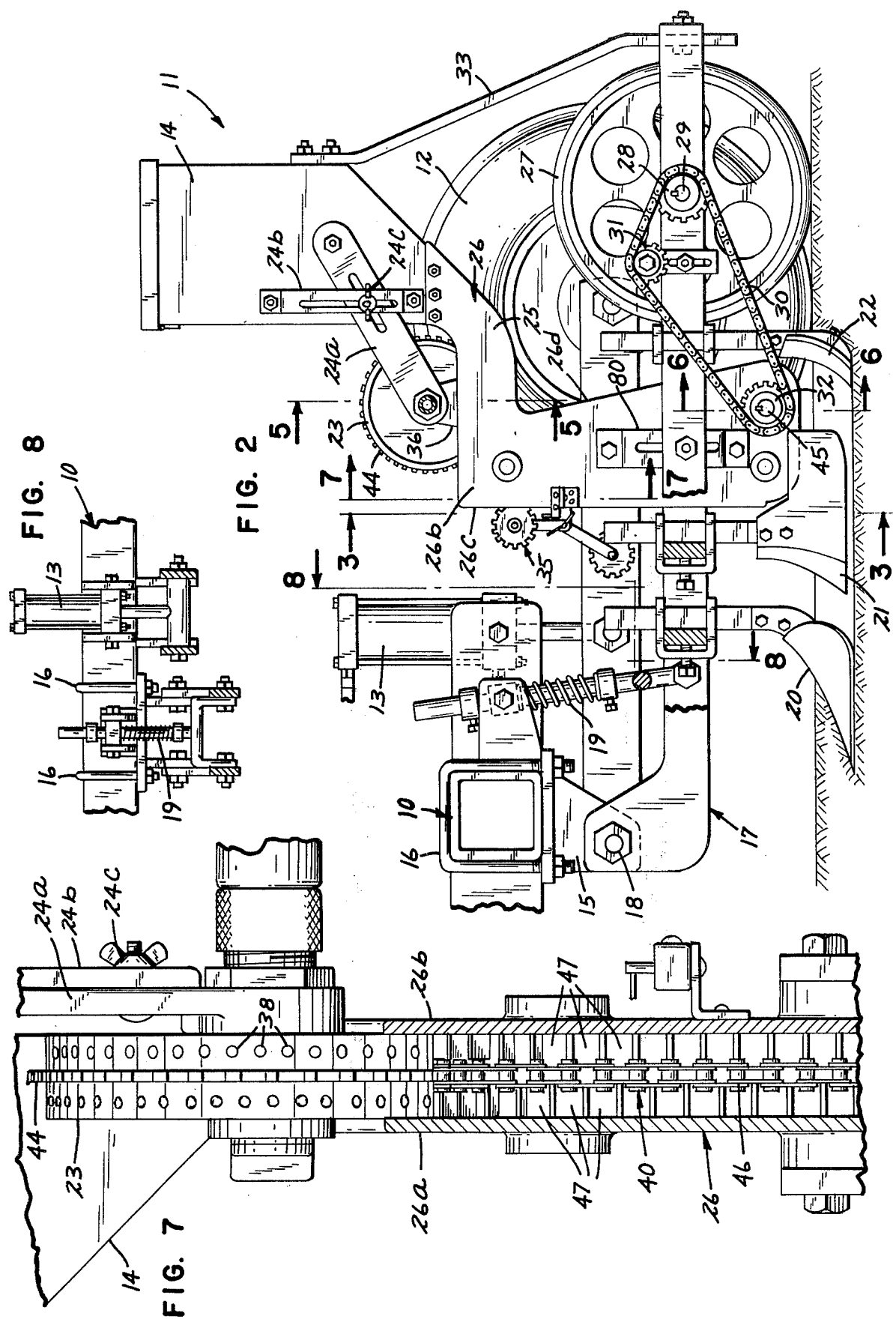

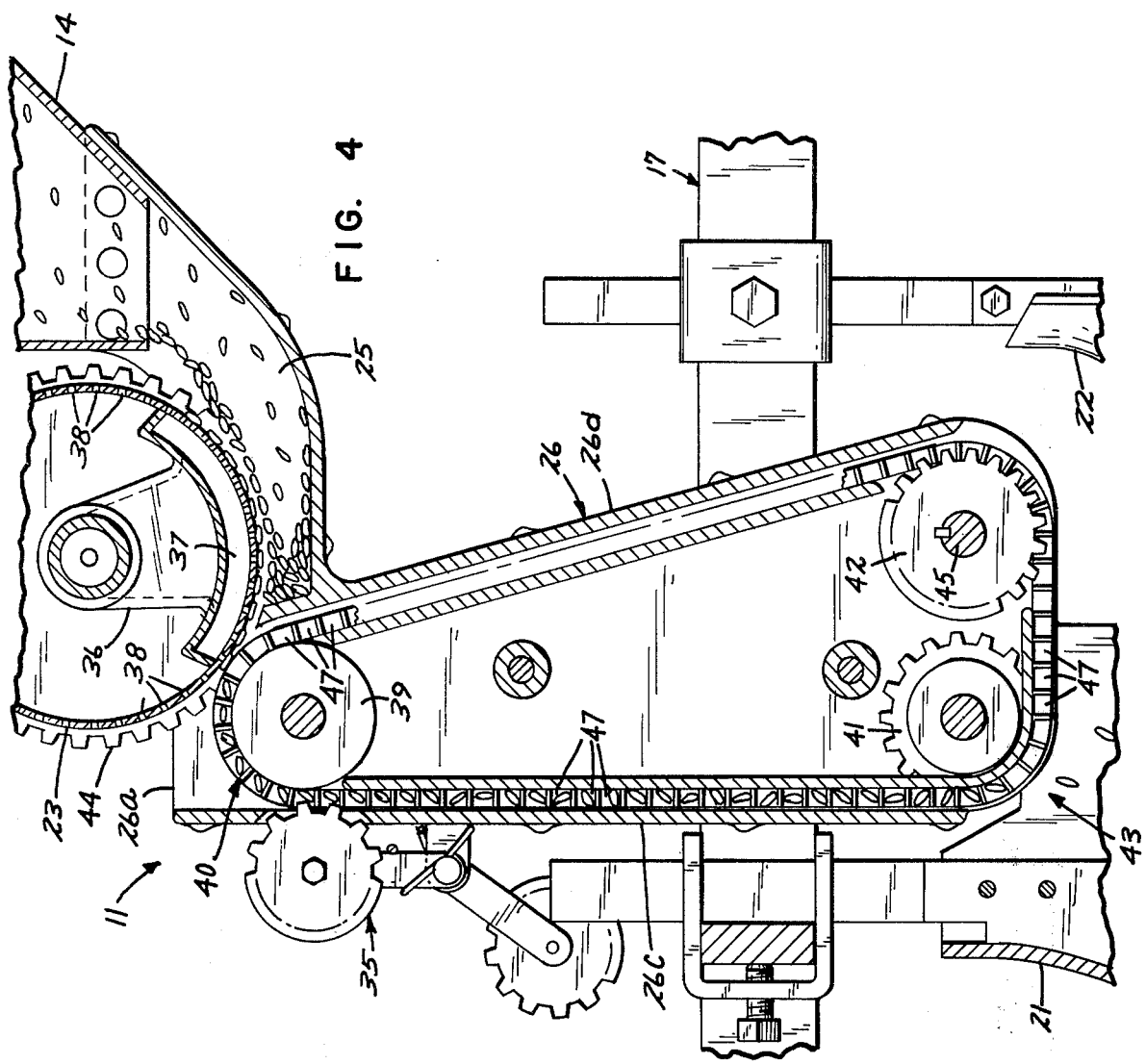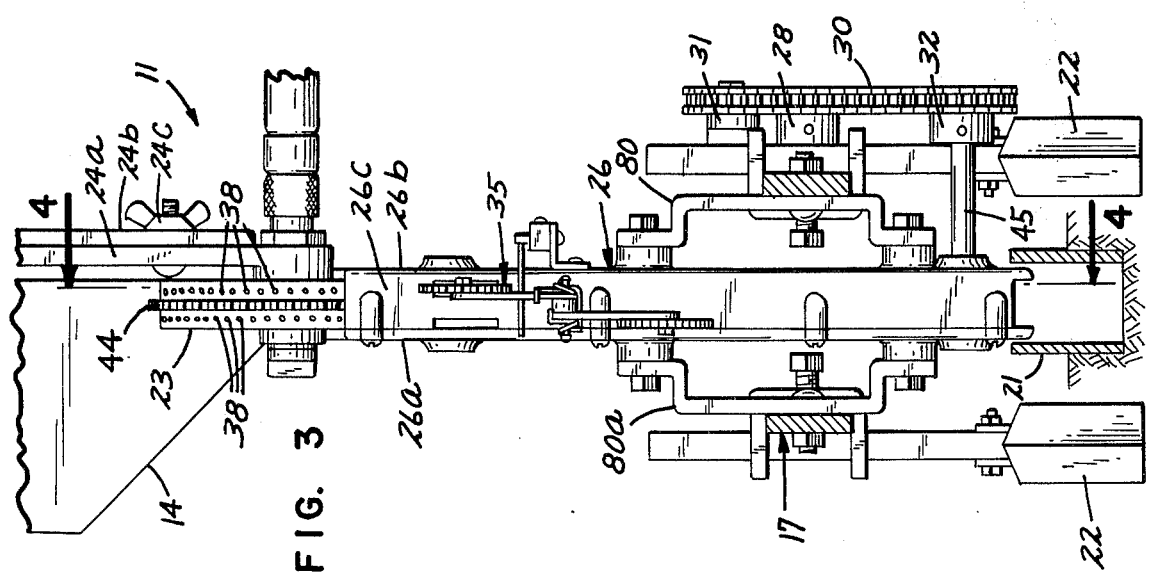

APPARATUS FOR PLANTING A PLURALITY OF INDIVIDUAL SEEDS IN A PLANTING FURROW

BACKGROUND OF THE INVENTION

1. Field of the Invention

This invention generally concerns a device for planting seeds and more specifically concerns a device for directly and positively transporting a predetermined number of seeds from a seed hopper to a position in close proximity to the planting site in the tilled soil.

2. Prior Art

In commercial agricultural planting it is very important to insure a regular and predetermined rate of seed application along a plowed furrow. The rate of seed application is variable and is generally a function of the spacing requirements of a given plant or seed crop to insure the proper amount of nutrients, water, root space, etc. For example, it has been determined that the optimum planting rate for corn is approximately one seed kernel per 6 inches in the furrow, and for beans is approximately one seed bean per 1 inch in the furrow.

To achieve this end, various seed planters have been devised and implemented. The prior art provides various devices for picking a predetermined number of seeds out of a seed hopper and then releasing those seeds above the planting site in the soil. These devices range from the use of mechanical fingers to vacuum assists to insure that only a predetermined number of seeds are picked from the seed hopper and dropped to the soil at a uniform rate. In some prior art devices, a chute or tube is provided to guide the seeds into place after they are picked from the hopper and dropped to the ground. In other devices, the seeds are dropped directly to the ground after being picked from the hopper. Depending upon the type and placement of the seed pick-up mechanism and the seed release point, the seeds may fall varying distances from several inches to a foot or more. Herein lies the problem. When seeds are dropped into place they are subject to bounce and roll and therefore inaccurate placement. Further, when fragile seeds are being planted, they can be damaged by dropping and rolling.

Even where the planter is provided with a chute or tube to help guide the seed into position, the pitch and roll of the tractor and implement while traveling over a field will result in inaccurate seed placement. Therefore, the prior art leaves a need for a seed planter which provides accurate and uniform placement of the seeds along the furrow.

SUMMARY OF THE INVENTION

The present invention achieves the need for a seed planter that provides accurate and uniform seed placement along the furrow.

The present invention includes a seed conveyor, having one or more rows for conveying seeds, in combination with a seed hopper and a seed pick-up means for transferring a predetermined number of seeds from the hopper to the conveyor.

BRIEF DESCRIPTION OF THE DRAWINGS

FIG. 1 is a top plan view of a seed planter constructed in accordance with the present invention;

FIG. 2 is a side elevational view on an enlarged scale of the planter of FIG. 1, portions thereof being broken away and shown in section;

FIG. 3 is an enlarged view in vertical section as seen along line 3—3 of FIG. 2;

FIG. 4 is a view in vertical section as seen along line 4—4 in FIG. 3;

FIG. 5 is an enlarged detailed sectional view as seen along line 5—5 of FIG. 2;

FIG. 6 is an enlarged detailed sectional view as seen along line 6—6 of FIG. 2;

FIG. 7 is an enlarged sectional view as seen generally along line 7—7 of FIG. 2;

FIG. 8 is a sectional view as seen generally along line 8—8 of FIG. 2;

DETAILED DESCRIPTION OF THE DRAWINGS

Figure 9:
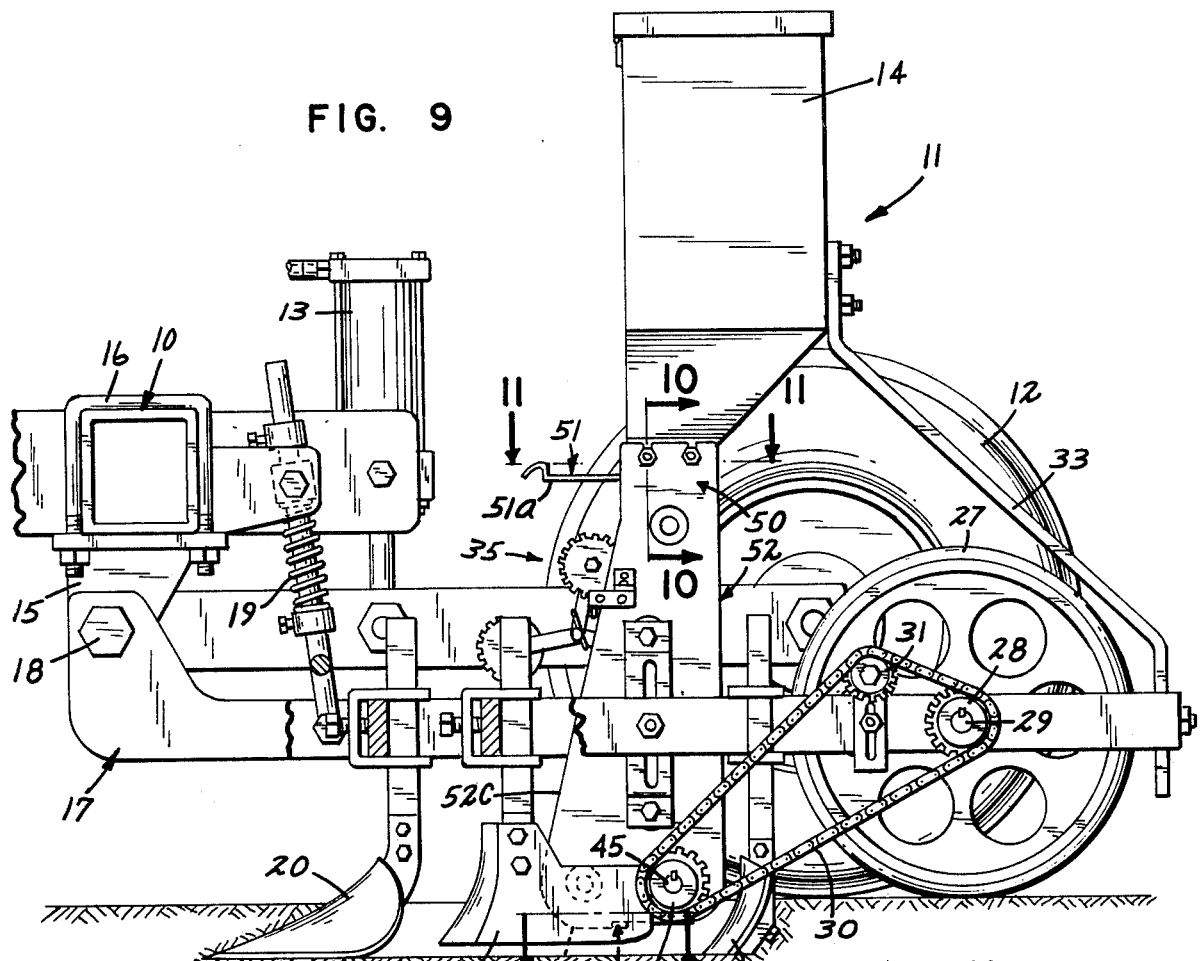
FIG. 9 is a side elevational view of an alternate embodiment of the present invention.

In a typical multi-row planter, as is described in FIGS. 1 and 2, a tool bar 10 facilitates connection of the individual planter units 11 to a tractor (not shown). A number of U-bolts 16 fit over tool bar 10 and are bolted to a mounting bracket 15 of a planter mounting frame 17. The frame 17 is the means by which the various tools and parts of the planter units are carried. The bracket 15 and frame 17 are connected and secured at a mounting frame pivot point 18. The mounting frame 17 includes a compression spring 19 bolted thereon which extends upward and is connected to the tool bar 10 such that spring 19 acts as a biasing member between tool bar 10 and frame 17.

Positioned to the rear of spring 19 on frame 17 is a furrowing blade 20 which is bolted to and carried by frame 17. Immediately to the rear of furrowing blade 20 is a planting shoe 21 followed by furrow cover blade 22. Planting shoe 21 and covering blades 22 are also bolted to and carried by frame 17. Each of the three furrowing members are elevationally adjustable on frame 17 to permit proper positioning with respect to the soil during planting operations. The frame 17 is itself elevationally adjustable from a planting position to a towing position. This is accomplished by a standard hydraulic elevational ram 13. A standard support wheel 12 is provided for cooperation with the elevational ram 13 in elevating the planting units and to permit towing in the elevated position.

A seed hopper 14 is provided on each planting unit and is attached to frame 17 by a support member 33. Support member 33 is bolted to frame 17 near the rear portion thereof and extends upward to hopper 14 and is bolted to the back of the hopper. The hopper is narrower at the lower portion thereof where it is bolted to a planter housing 26. Housing 26 includes a pair of spaced, generally parallel side walls 26a, 26b, a vertical front wall 26c, and a rearwardly sloping rear wall 26d. The two side walls extend below front and rear walls 26c, 26d, to define an open bottom end for housing 26.

The upper portion of housing 26 forms a hopper bottom 25 into which seeds are introduced from hopper 14. Housing 26 extends downward from hopper 14 to a position adjacent the ground surface between planting shoe 21 and furrow covering blades 22. For additional support, housing 26 is bolted between a pair of mounting brackets 80, 80a which in turn are bolted to frame 17. The upper portion of housing 26 is open to permit insertion of a seed pick-up drum 23 into the hopper bottom 25. Seed pick-up drum 23 is rotationally attached to one end of a drum mounting arm 24a. Arm 24a is bolted to the drum at its other end. A vertically extending, elongated mounting bracket 24b with a vertical slot therein is mounted on hopper 14 such that when drum mounting arm 24a is attached thereto by wingnut 24c extending through the slot in bracket 24b and a corresponding slot in arm 24a, it will support the seed pick-up drum 23 and will permit easy removal of the drum from hopper bottom 25 by loosening the wingnut 24c and pivoting the arm upwardly.

In FIG. 4, the internal structure of housing 26 is shown revealing a seed conveyor means 40 and its cooperation with the seed pick-up drum 23. An internal vacuum plenum 36 which is stationary and is secured to mounting arm 24a is mounted within drum 23. Plenum 36 is attached to a vacuum source (not shown) and includes an arcuate vacuum chamber 37 which is slideably engageable with pick-up drum 23 as the drum rotates about plenum 36. The cylindrical surface of drum 23 which engages vacuum chamber 37 includes a plurality of apertures 38 which pass directly under vacuum chamber 37 when the drum is rotating. The size of the apertures on drum 23 is a function of the size of the seeds to be planted and therefore a series of interchangeable seed pick-up drums provides a variety of aperture sizes. The positioning of the pick-up drum 23 is such that it is placed in close proximity with the seeds in hopper bottom 25 as they emerge from hopper 14. When drum 23 rotates the apertures 38 will pass directly under vacuum chamber 37 and a suction will occur through each of the apertures and thereby causing the seeds to adhere to the pick-up drum with one seed carried by each aperture. As the drum 23 rotates and the apertures 38 pass out of engagement with vacuum chamber 37, the suction is lost and the seeds are released onto the seed conveyor 40. The seed conveyor 40 will carry the seeds individually from the seed pick-up drum 23 downward to a release point 43 where housing 26 has an opening formed therethrough. The seed release point is positioned immediately to the rear of the planting shoe 21 and is in close proximity with the planting site and the soil.

The seed conveyor 40 is formed by a drive chain 46 and individual seed pockets 47 formed on each side thereof as seen in FIG. 7. The pockets 47 are formed as lateral extensions on the drive chain 46. The pockets 47 on one side of the drive chain 46 are staggered with respect to the pockets 47 on the other side. Thus the wall between two pockets on one side is lined up with the middle of a pocket on the other side. Sprocket teeth 44 of seed pick-up drum 23 are engageable with the links of drive chain 46 and the double row of apertures 38 on drum 23 are also staggered or alternating such that a row of apertures corresponds with a row of seed pockets 47 on conveyor 40. Thus, when the seeds are released from seed pick-up drum 23 they will be received by the conveyor 40 with one seed in each pocket 47. When the seeds are carried downward on the conveyor from the pick-up drum, they are held in position by the front wall 26c and side walls 26a, 26b of housing 26. At the bottom of conveyor 40, the pockets 47 are inverted and move past the lower end of housing 26 where the seeds will be free to drop into the soil. As stated previously, the seed pockets 47 are alternately located on either side of the conveyor. This is to insure that the seeds will be released from the conveyor 40 in a staggered manner such that only one seed will be planted per position and, further to provide a desired spacing between the planted seeds.

Figure 15:
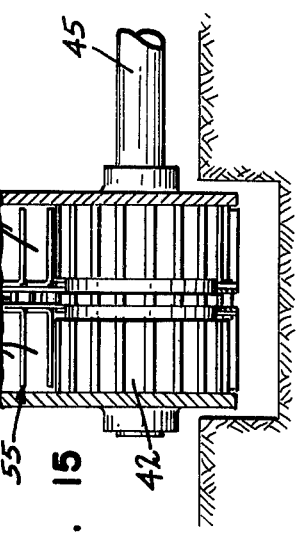
FIG. 15 is a sectional view as seen from the line 15—15 of FIG. 12.
Figure 12:
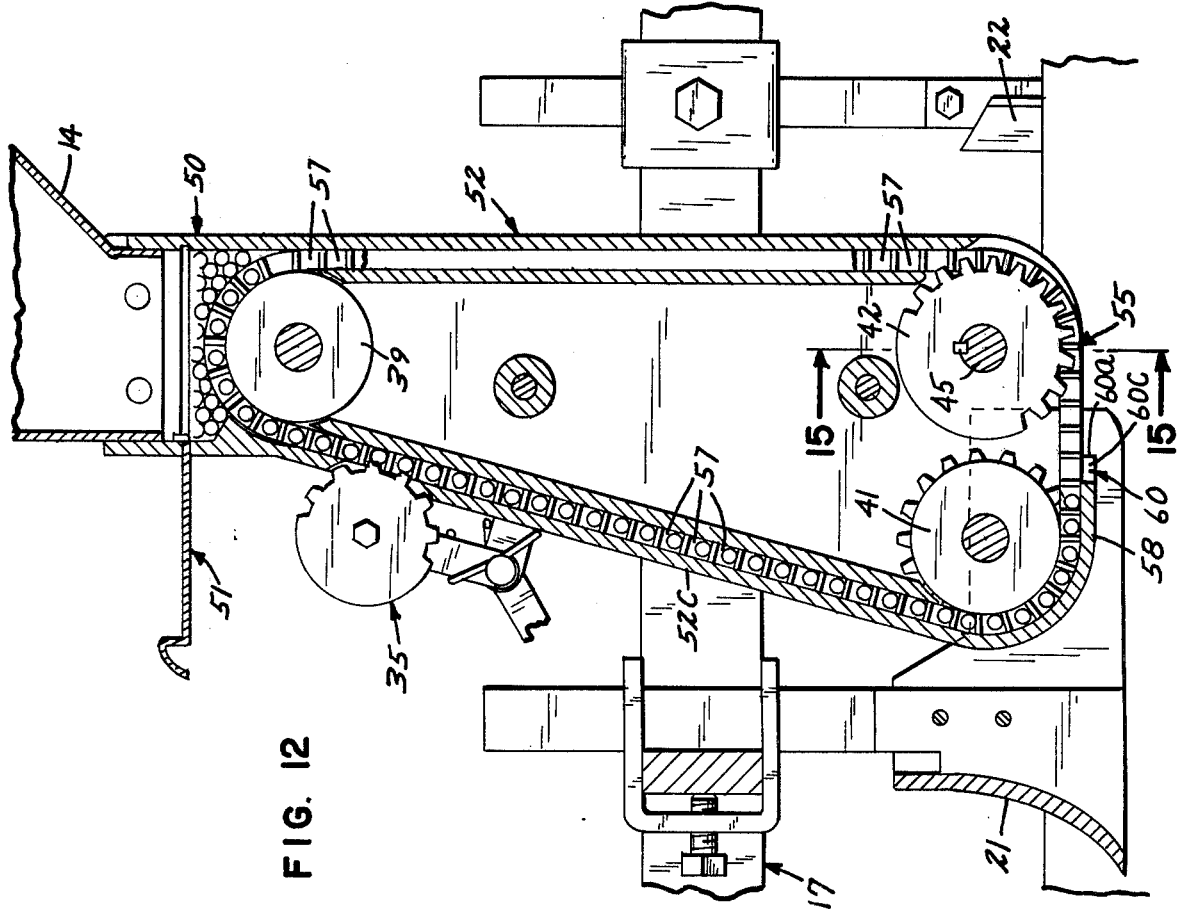
FIG. 12 is a view in vertical section, similar to FIG. 4, of the alternate embodiment of the present invention of FIG. 9.

The movement of the conveyor 40 is a function of the linear movement of the operational implement. This is provided by a press wheel 27 mounted on frame 17. During planting operations, the press wheel 27 rolls along the ground and rotates a drive axle 29. A geared roller 28 is keyed to axle 29 such that when axle 29 is rotating, gear 28 will also rotate. The sprockets on roller 28 engage a drive chain 30 which is engaged to two similar roller gears 31, 32. Roller gear 31 is an idler which also serves as a tension member for drive chain 30. Gear 32 is a driven gear. A drive shaft 45, which is keyed to gear 32, extends through housing 26 and engages an internal gear 42. Thus when gear 32 is driven by press wheel 27, it rotates drive shaft 45 which in turn rotates gear 42 within housing 26. Gear 42 is mounted in the lower right portion of housing 26 as viewed in FIG. 4 and is engaged with the drive chain 46 of seed conveyor 40. The teeth on gear 42 are further engaged with seed pockets 47, as shown in FIGS. 4 and 15, whereby any seeds which have not yet dropped from pockets 47 will be forced clear of those pockets as the conveyor moves past gear 42. The conveyor 40 extends up and around an idler roller 39 and down and around a lower left gear 41. Idler roller 39 and gear 41 are also mounted within housing 26. When conveyor 40 is in motion (rotating counterclockwise as viewed in FIG. 4), the drive chain 46 is engaged with sprockets 44 of pick-up drum 23 and thus drum 23 rotates around plenum 36 thereby continually picking up seeds from hopper bottom 25 and depositing them in seed pockets 47.

The conveyor's seed pockets 47 engage a warning device 35 which detects the absence of seeds from pockets 47 or any other malfunction. The warning device 35 is connected to a signal means, not shown, to alert the planter operator when seeds are not being planted.

Figure 11:
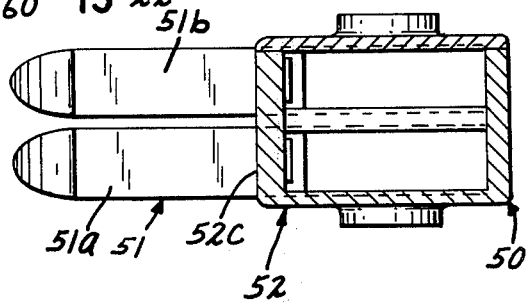
FIG. 11 is an enlarged horizontal sectional view as seen along line 11—11 of FIG. 9.
Figure 10:
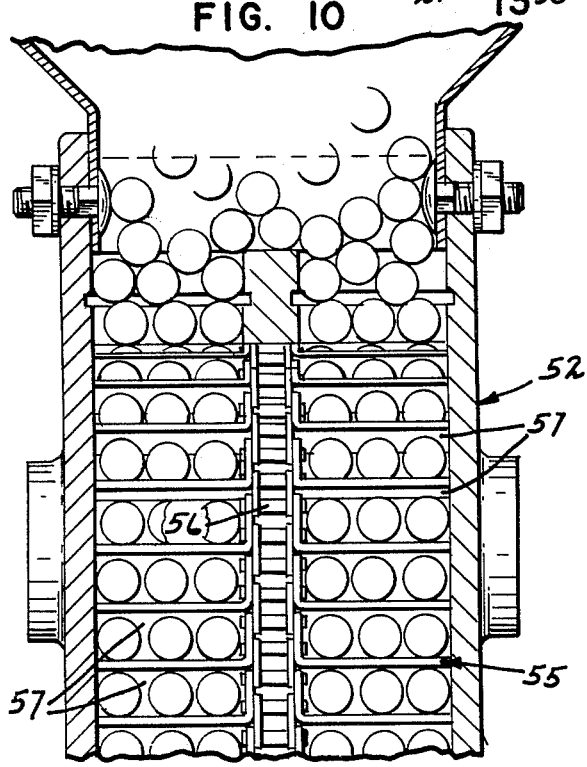
FIG. 10 is an enlarged sectional view as seen along line 10—10 of FIG. 9.

A second embodiment of the present invention, as shown generally in FIG. 9, includes a gravity-fed seed conveyor. Replacing the vacuum-assisted seed pick-up drum is a shutter gate means 51 separating the hopper 14 from a modified hopper bottom 50. The shutter gate 51 can accommodate a double row conveyor with tandem shutter gates 51a and 51b as seen in FIG. 11. The housing 52 of this embodiment is a modified version of housing 26 of FIG. 2. Housing 52 is positioned directly beneath hopper 14 so that the comparatively small hopper bottom 50 is positioned directly above seed conveyor 55 as it turns over idler roller 39. When shutter gate means 51 is open, the seeds pass from the hopper into the hopper bottom 50 where the seeds fall into seed pockets 57 as the seed conveyor 55 moves through the hopper bottom.

Figure 13:
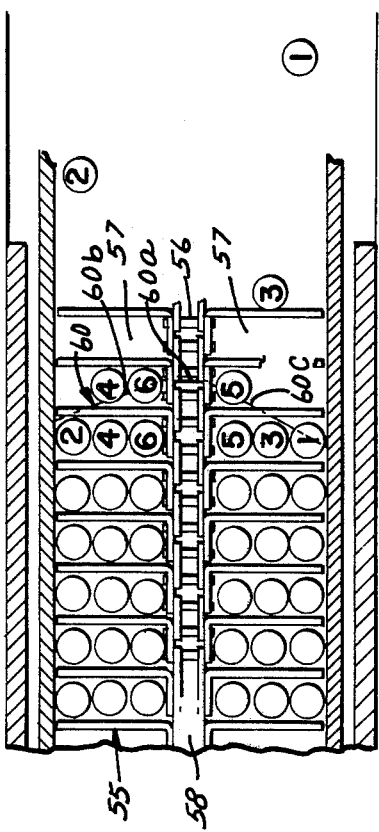
FIG. 13 is a view in horizontal section as seen generally from the line 13—13 of FIG. 9.

The seed conveyor 55, as shown in FIG. 13 of this embodiment is modified to provide seed pockets 57 with multiple seed capacity on each side of drive chain 56. This is accomplished by increasing the length of the lateral extension members outwardly from drive chain 56 such that each pocket 57 can accommodate three seeds. In order to achieve an evenly staggered seed release pattern, a modified release means is provided. Housing 52 includes a longer front wall 52c thereon which curves around gear 41 and froms a bottom wall portion 58. As shown in FIG. 13, a rearwardly facing edge 60 of wall portion 58 is formed, on both sides, to slope forwardly from drive chain 56 such that the angle of the edge on one side of the conveyor is different than that on the opposite side. As viewed from the top, edge 60 has an elongated center portion 60a positioned over chain 56, and two side portions 60b and 60c which slope forwardly at different angles. This insures a sequentially staggered seed drop and an evenly spaced seed planting pattern. The numerical order of the seed drop is indicated on FIG. 13.

Figure 14:
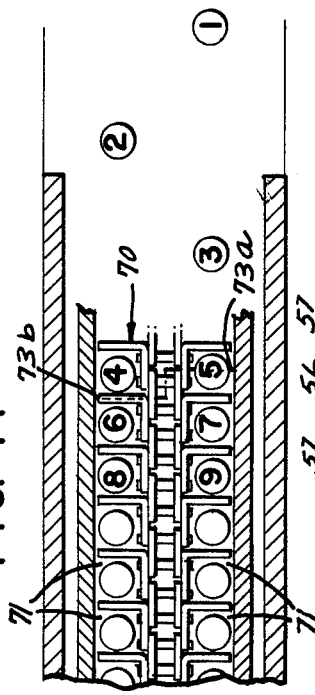
FIG. 14 is a view, similar to FIG. 13, showing an alternate embodiment of FIG. 13.

The second embodiment of the present invention can also accommodate a double row single seed conveyor as shown in FIG. 14. A double row conveyor 70 is shown with non-alternating single seed pockets 71. To achieve an even seed spacing pattern with a non-alternating design requires a modification of the housing bottom plate 58. Here a rearward edge 73a of plate 58' extends a distance of approximately one-half of the length of an individual seed pocket 71 beyond that of edge 73b on the opposite side of seed conveyor 70. Edges 73a and 73b are both perpendicular to the conveyor 70. This will also provide an evenly spaced seed planting pattern as is indicated numerically on FIG. 14.

From the foregoing description it can be seen that the present invention satisfies the need for a seed planter that provides accurate and uniform seed placement along the furrow. Utilizing a seed conveyor which carries a predetermined number of seeds directly from the seed hopper to a release point close to the soil provides a much better and more accurate system for seed planting. Where the seeds are carried directly from the seed hopper on a seed conveyor and released just above the ground, the bounce and roll that is experienced with the free-fall type planters is eliminated, thus providing very accurate seed placement and gentle seed handling.

It will be apparent that various changes and modifications in the illustrative embodiments of the invention, shown and described herein, can be made without departing from the scope of the invention as defined in the appended claims.

What is claimed is:

1. A seed planter, having furrowing means and a planting shoe, said planter comprising:
   a. at least one seed hopper;
   b. means for regulating discharge of seeds from said hopper;
   c. an endless conveyor comprising an endless chain having a plurality of lateral extensions thereon forming a plurality of regularly spaced pockets on either side of said chain, said conveyor being positioned such that it is in close engagement with said means for regulating discharge of seeds from said hopper, and extending downwardly from said hopper to a point in close proximity to a planting site adjacent the planting shoe, where said pockets of said conveyor are inverted and seeds carried in said pockets from said discharge regulating means are released from said pockets;
   d. means for driving said conveyor; and
   e. means for sequentially dropping seeds from the planter to the soil at or near the point where the conveyor pockets are inverted.

2. The seed planter of claim 1 wherein the means for regulating discharge of seeds from said hopper comprise a rotatable seed pick-up drum having a plurality of regularly spaced apertures therein, a plenum having a vacuum chamber mounted within said seed pick-up drum and about which said pick-up drum is rotatable, said rotatable seed pick-up drum being engageable with seeds in said hopper.

3. The seed planter of claim 1 wherein the means for regulating discharge of seeds from said hopper comprise at least one generally horizontally disposed gate which forms an openable closure at the bottom of said hopper.

4. The seed planter of claim 1 wherein the means for regulating the drop of seeds from the conveyor comprise a housing wall formed around said conveyor, said housing wall having a generally horizontal portion terminating in a rearward edge adjacent the point where the pockets of the conveyor are inverted with an opening at said rearward edge, said edge being shaped such that released seeds drop sequentially from the opening directly to the ground, said seed planter further comprising clearing means near the opening to force seeds not yet released from the pockets clear of the pockets.

5. The seed planter of claim 4 wherein the rearward edge comprises two steps over which the seed pockets pass, one step extending further rearwardly than the other step, whereby seeds in the pockets passing over said rearward step drop to the ground after seeds in the pockets passing over the more forward step.

6. The seed planter of claim 4 in which said pockets are sized to carry a plurality of seeds in each of said pockets.

7. The seed planter of claim 6 wherein said rearward edge comprises an elongated center portion from which two linear side portions extend forwardly at different angles, whereby a sequentially staggered seed drop is effected as seeds in the seed pockets pass over said rearward edge side portions.

* * * * *